United States Patent [19]
Ohta

[11] 3,993,527
[45] Nov. 23, 1976

[54] METHOD FOR PRODUCING SKI OR OTHER CURVED ARTICLES WITH RESILIENT MOLD

[75] Inventor: Mitsuharu Ohta, Hamakita, Japan

[73] Assignee: Nippon Gakki Seizo Kabushiki Kaisha, Japan

[22] Filed: Apr. 9, 1975

[21] Appl. No.: 566,407

Related U.S. Application Data

[63] Continuation of Ser. No. 351,833, April 17, 1973, abandoned.

[52] U.S. Cl. .............................. 156/245; 156/323; 156/580
[51] Int. Cl.² ..................... B30B 9/22; B30B 9/38
[58] Field of Search ........... 156/228, 245, 288, 323, 156/580, 581, 583; 264/219, 239, 241, 248; 100/211

[56] References Cited
UNITED STATES PATENTS

| | | | |
|---|---|---|---|
| 2,276,035 | 3/1942 | Guhl | 156/288 |
| 3,549,461 | 12/1970 | Bennett | 156/583 |
| 3,616,014 | 10/1971 | Weglin | 156/228 |

*Primary Examiner*—Caleb Weston
*Attorney, Agent, or Firm*—Lerner, David, Littenberg & Samuel

[57] ABSTRACT

A method for producing skis or other articles having curvature, wherein a mold of resilient material is used. The mold has a cavity of a shape substantially conforming to the plan contour of the ski, but the upper and lower surfaces of the cavity are made simply flat without being given a camber. The members constituting a ski are placed in the cavity with adhesive films interposed therebetween. Then the resilient mold is closed and thereafter is placed on a rigid base mold having a surface conforming in shape to the camber of the ski. The resilient mold having the ski members therein is pressed to the curved surface of the base mold while being heated, whereby the ski members are easily given a permanent camber or curvature required for a completed ski.

5 Claims, 20 Drawing Figures

METHOD FOR PRODUCING SKI OR OTHER CURVED ARTICLES WITH RESILIENT MOLD

This is a continuation of application Ser. No. 351,833 filed Apr. 17, 1973, now abandoned.

This invention relates to a method for producing skis, archeries, or other articles having curvature. More particularly, the invention relates to the method for producing skis or other curved articles by using an improved resilient mold.

The conventional method for producing, for example, skis are devided into two methods, that is, one is sandwiching method and the other is molding method.

In the former method, ski upper members, a core member and ski lower members are put together in layers, and the combined materials are bent in the direction of the thickness to promide a necessary camber, and then the product is subjected to cutting, and thereafter, the parts such as steel edges, top protector and tail end protector are attached. Therefore, the steps in the production become many and it takes very much time to produce the skis through such method.

While, in the latter method, the cavity of a mold having completely same shape as that of a ski is filled with several component materials of a ski, and the molding is carried out by heat and pressure. In this case, the steel edges and the top and tail protectors are previously formed in accordance with the shape of the ski to be produced.

Although this method has some advantage that this can be produced through less steps involved, and that it is suitable for mass production, to a certain degree, there are still disadvantages that the cost of such mold becomes very expensive, and that once the mold is formed into a predetermined shape; that shape can never be changed unless such mold is replaced by another. Therefore, when the shape of the ski is to be changed, the whole mold must be changed. According to the recent improvements and fashions, nevertheless it often happens to change the configuration of the skis as produced, which calls for frequent replacements of the expensive molds, incurring high cost for ski production. This holds true not only for the skis but also for other articles having the curved surfaces.

Accordingly, one object of the present invention is to propose an improved method for producing skis or other curved articles, in which such articles can be produced easily and less expensively.

Another object of the invention is to propose such improved method, in which curvature of such articles can be easily formed.

Further object of the present invention is to propose such improved method, in which such articles of different curvatures can be easily produced.

Still further object of the present invention is to proposed a novel mold which is used for the above method.

Pursuant to the above objects, the invention proposes an improved method for producing a curved article which is characterised in the steps of: preparing a mold of resilient material having a cavity of a shape substantially conforming to the plan contour of the article, the upper and lower surfaces of the cavity being made nearly flat without being given a curvature entirely conforming to the curvature, in thickness direction, of the article finally required; placing into the cavity members constituting the article which are not given a final curvature; further placing the resilient mold having such members of the article on a rigid base mold having a surface conforming in shape to the curvature finally required for the article; and thereafter pressing the resilient mold containing the members of the article, on to the base mold while simultaneously heating the members of the article, whereby the article having a given curvature is obtained.

The nature, principle and detail of the invention will be more clearly apparent from the following detailed description with respect to preferred embodiments of the invention with the accompanying drawings, in which.

Figure 5:
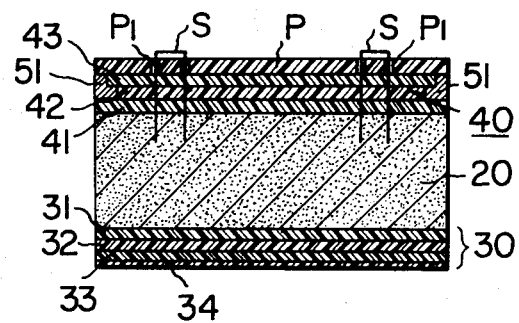
Figure 6:
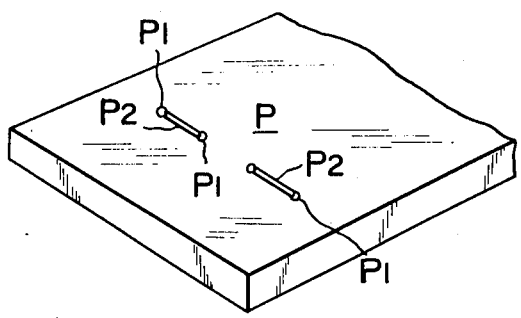
Figure 7:
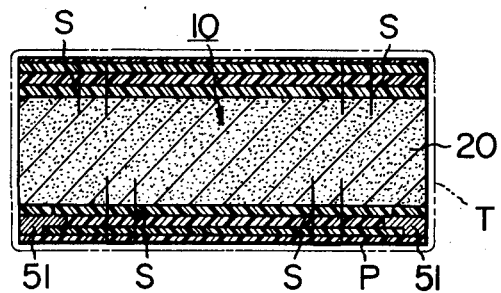
Figure 8:
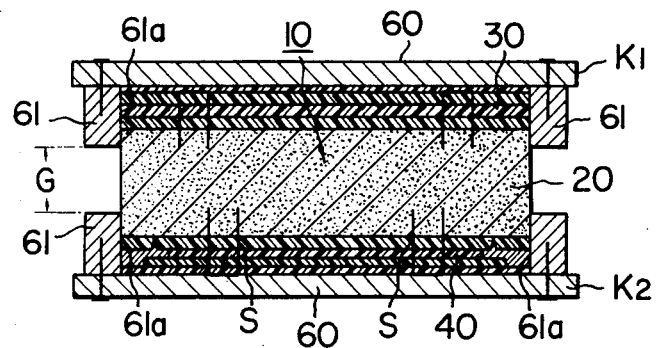
Figure 9:
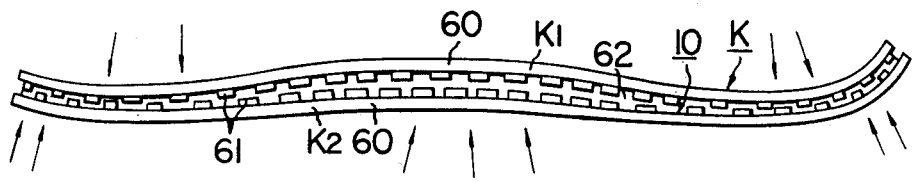
Figure 10:
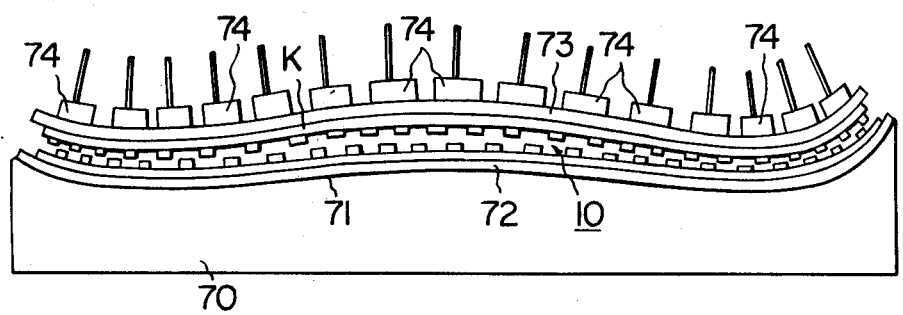
Figure 11A:
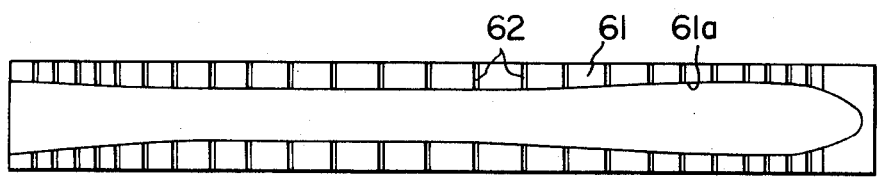
Figure 11B:
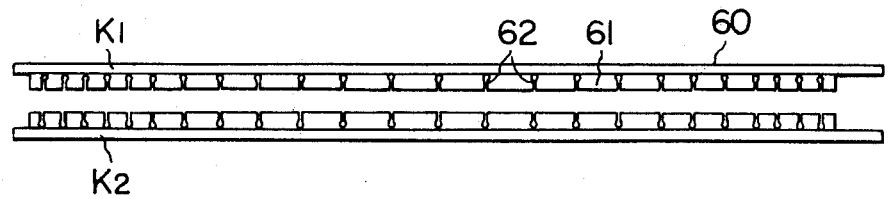
Figure 13:
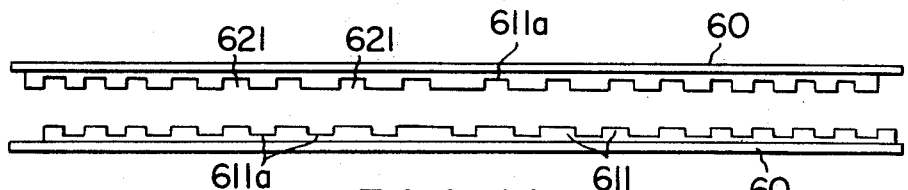
Figure 14:
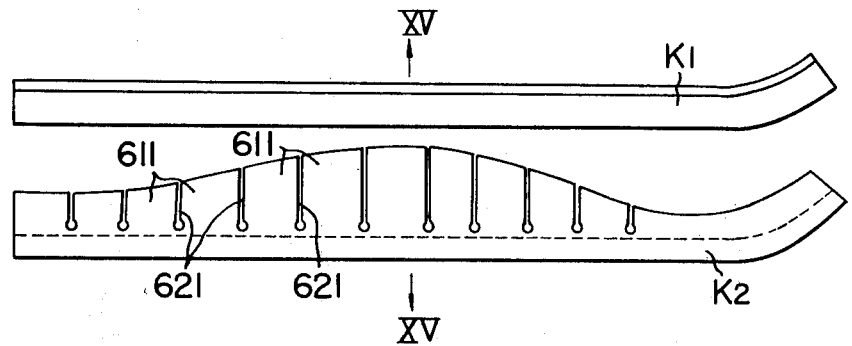

FIG. 4 A, B, C and D are schematic illustrations of fragmental sections of the ski body and several parts for the ski;

FIG. 5 is a transversal cross-sectional view of the ski body showing the relation to a staple supporting plate;

FIG. 6 is a perspective view of a part of the staple supporting plate;

FIG. 7 is a transversal cross-sectional view of the ski body just before the insertion into the cavity of a resilient mold;

FIG. 8 is a transversal cross-sectional view of the ski body which is received in the mold;

FIG. 9 is a schematic illustration of a pressing step;

FIG. 10 is a side view showing an arrangement of a base mold and presses;

FIG. 11 A and B are a plan view and a side view, respectively, of one embodiment of the resilient mold;

FIG. 12 A and B are a plan view and a side view, respectively, of another embodiment of the resilient mold;

FIG. 13 is a side view of still other embodiment of the resilient mold;

FIG. 14 is a side view of further embodiment of the resilient mold; and

Figure 15:
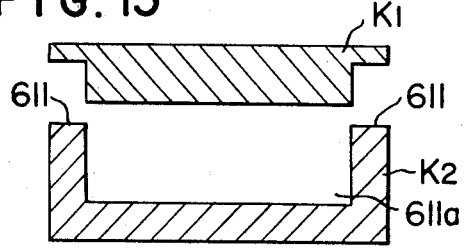

FIG. 15 is a transversal cross-sectional view taken along the line XV—XV of FIG. 14.

Referring now to the drawings, a ski body 10 as an example of a curved article comprises a core 20, upper members 30, lower members 40 and other necessary parts. The core 20 is made of hard foamed polyurethane, wood and the like, and the thickness and other dimensions of the core 20 may be properly determined before the use. Although the core 20 is previously shaped to the proper dimentions, it is not yet subjected to the bending such as the treatments of the unturned portion, arch bend and tail end portion in the initial stage of the present invention. The upper members 30 comprise an FRP (glass fibre reinforced plastic) plate 31 pre-impregnated with thermosetting resin adhesive dried in the B-stage, an intermediate plate 32 of ABS (acrylonitrile butadiene styrene) resin used for temperature compensation, another FRP plate 33 pre-impregnated with thermosetting resin adhesive, and an upper surface plate 34 made of ABS resin. The lower members 40 comprise an FRP plate 41 pre-impregnated with thermosetting resin adhesive, a plate 42 of ABS resin, and a sole plate 43 of polyethylene. Among the abovementioned parts, are steel edges 51 which are beforehand bent only in the transversal direction, top edges (not shown in drawings), a top protector 52, a top plate 53 and a tail end protector 54.

Figure 1:
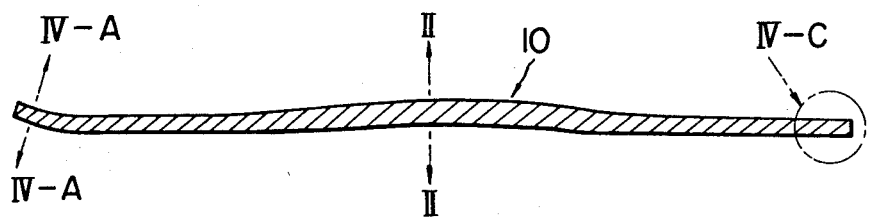
FIG. 1 is a longitudinal cross-sectional view of a ski body of the invention.
Figure 2:
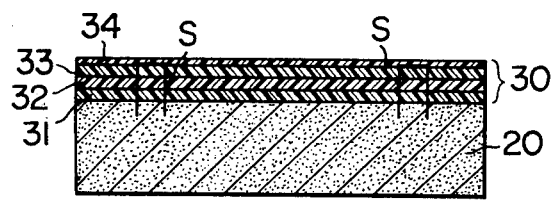
FIG. 2 is a transversal cross-sectional view of the ski body in one production step which is taken along the line II—II of FIG. 1.
Figure 3:
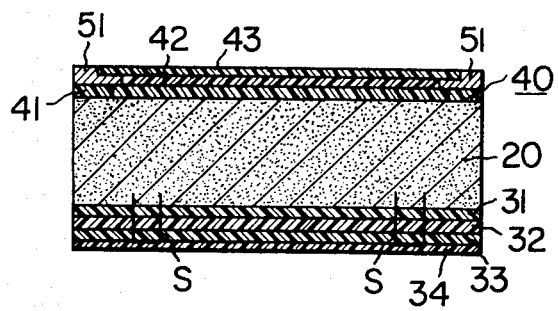
FIG. 3 is a transversal cross-sectional view of the ski body in the next production step.
Figure 4A:
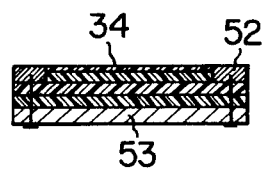
Figure 4B:
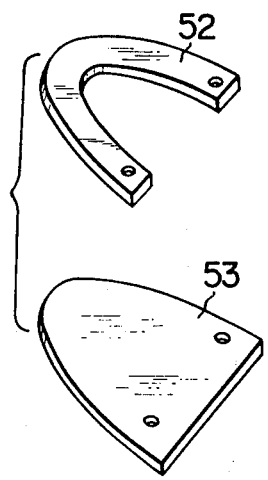
Figure 4C:
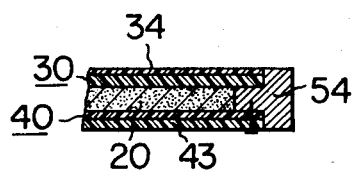
Figure 4D:
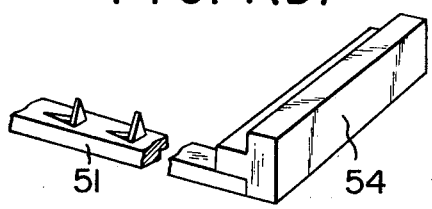

In the first place, the core 20 is placed on a table, and the upper members 30 are laid one by one on said core 20. In this step, the above-mentioned plates 31 to 33 except the upper surface plate 34 are temporarily fixed by staples S, and thereafter, the decorative surface plate 34 is placed on the FRP plate 33, as shown in FIG. 2. The core 20 having such upper members 30 on one side thereof is then turned over in upside-down, and each of the lower members 40 is put in layers one by one on the other side of the core 20, that is, in the order of the FRP plate 41 imprignated with thermosetting resin adhesive, the plate 42 of ABS resin, a pre-preg film of thermosetting resin adhesive, and the sole plate 43. Before the plates 42 and 43 are laid, however, the steel edges 51 are fitted along the both longitudinal edges of the ski body as shown in FIG. 3, and further, the top protector 52 and top plate 53 are temporarily fitted to the ski body, where the cross-section of the top portion of ski is shown in FIG. 4-A, and the longitudinal cross-section of the tail end portion is shown in FIG. 4-C. Thereafter the plate 42 and the sole plate 43 are laid on the above-mentioned layers.

Then a staple supporting plate P is placed on the layers of lower members 40 and on the steel edges 51. The staple supporting plate P is made of a material having resiliency, such as duralumin of, for instance, 1.8 mm in thickness, and the width of the staple supporting plate P is so determined as to conform to the width variation of the ski body 10. The stables S are knocked through holes $P_1$ in the staple supporting plate P up to the core 20, and thereby the lower members 40 and steel edges 51 may be temporarily fixed. This condition is shown in FIG. 5 in cross-section. While, as shown in FIG. 6, the staple supporting plate P is provided with holes $P_1$ and grooves $P_2$ for receiving said staples S.

The ski body 10 comprising the core 20, upper members 30 and lower members 40, together with the staple supporting plate P, are inserted into a tube T made of, for example, polyethylene, as indicated by a chain line in FIG. 7. Thereby, when the materials are heated and pressed in the mould the tube T prevents the resinous material from flowing out into the mold cavity, keeping the mold clean, and the tube further helps the ski body to be released easily from the mold after the moulding process is over. Instead of the tube T, a suitable plastic film may be used so as to wrap around the ski body.

In the above process, the shape of the ski in plan, i.e. the configurations in the longitudinal and transversal directions, has already been made; however, the configuration in the direction of vertical thickness of the ski body is not yet made.

Such ski body 10 is then put into the cavity of a rejilient K.

The resilient mold K comprises an upper mold $K_1$ and a lower mold $K_2$, each of which upper and lower molds $K_1$ and $K_2$ comprises an elongated resilient plate 60 and a plurality of blocks 61 disposed along the peripheral sides of the resilient plate 60. The blocks 61, which may be made of either a resilient or a non-resilient material, are fixed to the resilient plate 60 with rivets, screws, or other suitable means, or may be made integrally with the plate 60. The blocks 61 are arranged with a suitable space 62 left between the adjacent ones, as shown in FIG. 9, and a cavity 61a is formed by the blocks 61 arranyed on both sides of each resilient plate 60. The cavity 61a within said blocks 61 conforms to the plan shape or contour of the ski body 10. That is, the width of the cavity 61a is so made as to substantially conform to the width variation of the ski body 10. However, the inner upper or bottom surface of the upper or lower mold $K_1$ or $K_2$ is made nearly flat.

The ski body 10, as shown in FIG. 7, is housed in the cavity 61a formed by the upper and lower molds $K_1$ and $K_2$, as shown in FIG. 8. In this case, it should be noted that the blocks 61 of the upper mold $K_1$ are made higher than the thickness of the upper members 30, extending down to the core 20, and the blocks 61 of the lower mold $K_2$ are also made higher than the thickness of the lower members 40, extending up to the core 20, whereby the ski body 10 is securely held by the resilient mold K, so that the upper and lower members 30 and 40 are not shiftable sidewise with respect to the core 20. Between the blocks 61 of the upper and lower molds $K_1$ and $K_2$, gaps G are formed in the transversal direction of the ski body 10, which helps the mold K to be bent easily during the bending operation of the ski body 10.

After the ski body 10 is housed in the resilient mold K, the mold K having such ski body 10 is subjected to pressure, as indicated by arrows in FIG. 9, while being heated. As shown more clearly in FIG. 10, the resilient mold K incorporating the ski body 10 is placed on a rigid base mold 70 having an upper molding surface 71 conforming in shape to a given camber expected of a completed ski. A suitable plate heater 72 having a shape conforming to the camber of a completed ski is interposed between the base mold 70 and the resilient mold K, and another plate heater 73 also having a shape conforming to the chamber of a completed ski is placed on the resilient mold K, so that heat is applied to the resilient mold K from both of the upper and lower sides of the mold K. Pressure is applied to the mold by the use of a number of presses 74, usually 14 to 16 presses per ski body, which are arranged on the plate heater 73 along the length of the mold K, i.e., of the ski body 10. The pressure exerted on the mold K by each press 74 is directed to the upper molding surface 71 of the base mold 70, so that the resilient mold K as well as the ski body 10 is bent or curved conforming to the curvature given to the upper molding surface 71 of the base mold 70. Thus, the ski body 10 is subjected to pressure while simultaneously being heated, whereby the layers of the ski body 10 are adhered tightly and bent properly with each other. The time for this treatment is different according to the pressure and temperature as employed; however, it may be generally 30 minutes or so.

After the molding process, the ski body is taken out from the mold cavity, and the staple supporting plate P on the sole plate 43 is removed, in which the staples S can be drawn out from the ski body 10 at the same time.

Then the ski body is treated with the finish cutting of both longitudinal sides, grinding of the steel edges 51, forming of sole grooves on the sole plate 43 and surface finishing of the sole surface. The remaining small openings formed by the pulling out of said staples S are filled up in this finishing step. Lastly, the upper surface plate 34 is printed with a trade mark, other necessary letters and designed patterns to be placed on the market.

Now, the resilient mold K will be explained more specifically. The resilient plates 60 are made of duralumin, stainless steel, carbon steel, and the like, which have sufficient resiliency, namely, ability to spring back into shape after being deformed. The thickness of each resilient plate 60 may, for example, be 1.8 mm. The blocks 61 may also be made of the same material as that of the resilient plate 60, but may not necessarily be given resiliency, as the spaces 62 left between the blocks 61 secures the resiliency of the plates 60.

In the embodiment as shown in FIGS. 11 A and 11 B, the upper mold $K_1$ and the lower mold $K_2$ are provided with a number of blocks 61, which are defined by slits or spaces 62 extending transversely of the mold K. The slits 62 are formed more in number, and the distance between the adjacent slits in made narrower, at the portion of the mold K where the curvature is expected greater.

Figure 12A:
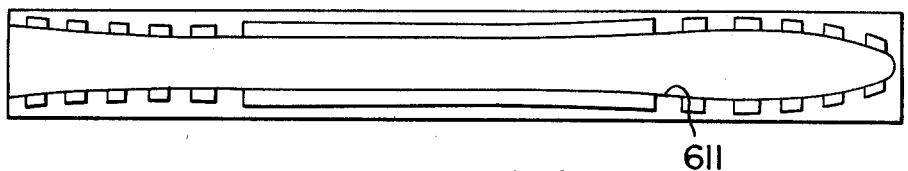
Figure 12B:
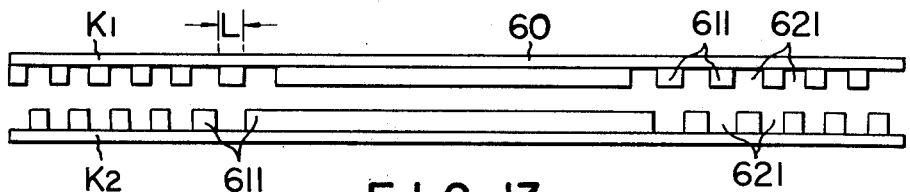

The mold K as shown in FIGS. 12A and 12B is another embodiment of the resilient mold K of the present invention, in which the lengths L of the blocks 611 are changed largely at portions where curvatures are expected greater and less, and the gaps 621 are widened. As will be understood, the length L of each block 611 may be determined according to the required resiliency of the mold K, and if the block 611 is long, the stiffness of the mold in that portion becomes large, so that if the sufficient bending is necessary, shorter blocks 611 may be used for such portions. As an example, the length L of the shorter blocks 611 at both end portion of the mold K is set to be about 15 mm, and that of the longer blocks 611 at the central portions of the mold K is set to be about 1 m. The lenth of the spaces 621 is set, for example, to 4 mm. As is seen from FIG. 12B, the shorter blocks 611 of the upper and lower molds $K_1$ and $K_2$ are not disposed on the same vertical lines, and the blocks 611 of either of the upper and lower molds are faced with the spaces 621 of the other of the molds. This arrangement of the blocks 611 and spaces 621 greatly facilitates the bending of the mold K. If the blocks of the upper and lower molds are arranged so as to be on the same vertical lines, the height of the blocks must be smaller in order to secure sufficient resiliency, but if the blocks are arranged as shown in FIG. 12B, the height of the blocks may be greater, in which case the height may be about 5.0 mm as an example.

Another embodiment of the mold K is shown in FIG. 13, in which the blocks 611 are connected by connecting pieces 611a.

Further embodiment of the resilient mold K is shown in FIGS. 14 and 15, wherein the blocks 611 are formed only on the lower mold $K_2$, and the upper mold $K_1$ is fitted in the cavity formed by the blocks arranged on both sides of the lower mold $K_2$. The lower mold $K_2$ has walls, on both sides thereof, which are divided by slits 621 into a number of such blocks 611. The top of the slitted walls is roughly shaped corresponding to the camber of the ski, and the walls have a height greater than the thickness of the ski body which will be housed in the cavity 611a. The inner bottom wall of the lower mold $K_2$ is made nearly flat, except the right end portion where the up-turning front part of the ski is located, as indicated by a dotted line in FIG. 14.

As will be understood from the above disclosure, according to the method of the present invention, the ski body having only the plan contour of a ski but not being given a camber required to the completed ski is placed in the cavity formed by the resilient upper and lower molds, and the bending of the ski body is carried out thereafter in the process of molding operation; therefore, the production process of the ski can be simplified to reduce the production cost for the ski. Further, the shape and curvature of the ski can be easily changed according to the requirements, only by replacing the base mold 70, which can be made of a material such as wood and can be easily and less expensively produced having a necessary curvature of camber. Therefore, the process of this invention is very convenient and useful for the production process for skis, acheries and other curved articles, reducing the production cost thereof substantially.

What is claimed is:

1. A method for forming an article having a desired curvature, which comprises preparing a resilient mold including an upper mold portion and a lower mold portion, each of said upper and lower mold portions comprising resilient metallic plates, said resilient metallic plates being planar and capable of returning to their original shape after being deformed, said resilient mold including a cavity of a shape substantially conforming to the plan contour of said article to be formed, said cavity being defined by block means arranged on said resilient metallic plates so as to form said resilient mold for retaining members constituting said article to be formed therein, disposing said members constituting said article to be formed into said cavity of said resilient mold with an adhesive interposed between said members, said members having the plan contour of the article to be formed but not the final curvature thereof, disposing said resilient mold including said members on a molding surface of a rigid base mold, said molding surface corresponding in shape to the curvature required in said article and subjecting said resilient mold containing said members within said cavity to pressure directed to said molding surface of said base mold, while simultaneously applying heat thereto, so that said resilient mold and said members therein are bent to confrom to the curvature of said molding surface of said base mold, and further whereby said resilient metallic plates return to their initial planar configuration upon the release of said pressure applied to said resilient mold.

2. The method of claim 1 in which a number of blocks are arranged on one of said resilient plates of said upper and lower mold portions so as to form a cavity, and the other of said upper and lower mold portions is insertible in said cavity, whereby said members constituting said article to be formed are retained in said upper and lower mold portions by said blocks and said other of said upper and lower mold portions.

3. The method of claim 1 in which said article is a ski.

4. The method of claim 1 wherein said heating step is carried out by disposing a first plate heater having a curvature substantially conforming to the curvature of said molding surface of said base mold between said molding surface and the lower portion of said resilient mold, and disposing a second plate heater having a curvature substantially conforming to the curvature of said molding surface of said base mold on top of said upper portion of said resilient mold.

5. The method of claim 4 wherein said pressure applying step is carried out by the use of a plurality of presses arranged on said second plate heater.

* * * * *